(12) United States Patent
Goldwasser (10) Patent No.: US 10,966,380 B1
(45) Date of Patent: Apr. 6, 2021

(54) ALFALFA VALVE TELEMETRY SYSTEM

(71) Applicant: Jack Martin Goldwasser, Grants Pass, OR (US)

(72) Inventor: Jack Martin Goldwasser, Grants Pass, OR (US)

(*) Notice: Subject to any disclaimer, the term of this patent is extended or adjusted under 35 U.S.C. 154(b) by 157 days.

(21) Appl. No.: 16/154,568

(22) Filed: Oct. 8, 2018

Related U.S. Application Data (60) Provisional application No. 62/575,195, filed on Oct. 20, 2017.

(51) Int. Cl.
| | | |
|---|---|---|
| *A01G 25/16* | (2006.01) | |
| *A01G 25/02* | (2006.01) | |
| *A01G 27/00* | (2006.01) | |
| *F16K 31/44* | (2006.01) | |
| *F16K 3/02* | (2006.01) | |

(52) U.S. Cl.
CPC .......... *A01G 25/167* (2013.01); *A01G 25/02* (2013.01); *A01G 27/003* (2013.01); *F16K 3/0218* (2013.01); *F16K 31/445* (2013.01)

(58) Field of Classification Search
CPC .... A01G 25/167; A01G 25/02; A01G 27/003; F16K 3/0218; F16K 31/445
See application file for complete search history.

(56) References Cited

U.S. PATENT DOCUMENTS

| | | | | |
|---|---|---|---|---|
| 2,759,369 A | * | 8/1956 | Ginocchio | F16K 31/56 74/520 |
| 5,342,144 A | * | 8/1994 | McCarthy | E03F 1/00 405/36 |
| 10,039,242 B1 | | 8/2018 | Goldwasser | |
| 2005/0025573 A1 | * | 2/2005 | Waldman | F16K 1/205 405/41 |
| 2016/0048135 A1 | * | 2/2016 | Hill | A01G 25/167 405/37 |
| 2018/0153111 A1 | * | 6/2018 | Gao | A01G 25/167 |

* cited by examiner

*Primary Examiner* — Chad G Erdman
(74) *Attorney, Agent, or Firm* — Jerry Haynes Law (57) ABSTRACT

An alfalfa valve telemetry system for regulating irrigation fluid to an irrigation-dependent field provides an alfalfa valve that operates over an opening to a fluid supply pipe in a field, so as to selectively discharge fluid to the field. The alfalfa valve telemetry system provides a telemetry-controlled valve actuation assembly that axially or pivotally displaces the alfalfa valve between an open position and a closed position over the opening in the pipe. A valve actuation assembly displaces the lid, axially, or pivotally, over the opening of the pipe. A mounting portion anchors the valve actuation assembly to the pipe. Environmental sensors and fluid sensors in the field communicate data signals with a primary controller that controls the valve actuation assembly. The position of the alfalfa valve is based upon the data signals received from the sensors, indicating fluid levels, fluid flow rate, and environmental conditions on and near the field.

17 Claims, 7 Drawing Sheets

ALFALFA VALVE TELEMETRY SYSTEM

CROSS-REFERENCE TO RELATED APPLICATIONS

This application claims the benefits of U.S. provisional application No. 62/575,195, filed Oct. 20, 2017 and entitled AUTOMATED ALFALFA VALVE CONTROL SYSTEM AND METHOD FOR REGULATING FLOW OF IRRIGATION WATER TO A FIELD, which provisional application is incorporated by reference herein in its entirety.

FIELD OF THE INVENTION

The present invention relates generally to an alfalfa valve telemetry system. More so, the present invention provides an alfalfa valve that operates over an opening to a fluid supply pipe in an irrigation-dependent field; whereby the system provides a telemetry-controlled valve actuation assembly that axially or pivotally displaces the alfalfa valve between an open position and a closed position over the opening in the supply pipe to regulate the flow of fluid to the field; and whereby the position of the alfalfa valve is based upon data signals received from environmental and fluid sensors that provide data signals, indicating fluid levels, fluid flow rate, and environmental conditions on and proximal to the field.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, agricultural irrigation is the method in which water is supplied to plants at regular intervals for agriculture. Irrigation is used to assist in the growing of agricultural crops, maintenance of landscapes, and revegetation of disturbed soils in dry areas and during periods of inadequate rainfall. In contrast, agriculture that relies only on direct rainfall is referred to as rain-fed or dry land farming. Often, alfalfa valves are used in an agricultural field to regulate supply of fluid from subterranean pipes, so as to allow fluid to flow into the field. The valves can be controlled manually, or automatically to open and close, based on environmental and water conditions.

Irrigation systems have been previously provided for the remote control of irrigation systems and components thereof. One prior art device for remotely controlling irrigation systems is the base station control. The base station control utilizes RF telemetry or cell phone telemetry to read the status of and control irrigation components from a personal computer. The base station can regulate the release of water into the field remotely, and after certain conditions have been met.

Other proposals have involved irrigation of a field through telemetry means. The problem with these irrigation systems is that they do not provide both axial and pivotal articulation of the lid for the alfalfa valve. Also, they do not utilize environmental data, fluid level data, and fluid flow data to derive a data signal that actuates the alfalfa valve. Even though the above cited irrigation systems meet some of the needs of the market, an alfalfa valve that operates over an opening to a fluid supply pipe in an irrigation-dependent field; whereby the system provides a telemetry-controlled valve actuation assembly that axially or pivotally displaces the alfalfa valve between an open position and a closed position over the opening in the supply pipe to regulate the flow of fluid to the field; and whereby the position of the alfalfa valve is based upon data signals received from environmental and fluid sensors that provide data signals, indicating fluid levels, fluid flow rate, and environmental conditions at the field, is still desired.

SUMMARY

Illustrative embodiments of the disclosure are generally directed to an alfalfa valve telemetry system. The alfalfa valve telemetry system provides an alfalfa valve that operates over an opening to a fluid supply pipe in an irrigation-dependent field. The alfalfa valve telemetry system provides a telemetry-controlled valve actuation assembly that axially or pivotally displaces the alfalfa valve between an open position and a closed position over the opening in the supply pipe to regulate the flow of fluid to the field. The position of the alfalfa valve is based upon data signals received from fluid and environmental sensors that generate data signals based on fluid levels, fluid flow rate, and environmental conditions on and proximal to the field.

In some embodiments, the alfalfa valve telemetry system, comprises an alfalfa valve comprising a stem carrying a lid. The alfalfa valve is configured to operate directly over an opening of a pipe defined by a perimeter forming a flange. In an open position, the alfalfa valve enables free flow of fluid through an opening in the pipe. In a closed position, the alfalfa valve restricts the free flow of fluid through the opening in the pipe.

The alfalfa valve telemetry system further provides a valve actuation assembly that displaces the lid between the open position and closed positions. The valve actuation assembly comprises a lever defined by a first end and a second end. The valve actuation assembly further comprises a sleeve that slidably receives the first end of the lever. The second end of the lever is attached to the lid of the alfalfa valve to raise and lower the lid from the opening in the pipe in an axial, up and-down arrangement. The lever axially slides through the sleeve to displace the lid between the open and closed positions.

In other embodiments however, a pivotable arm attaches to the lid, and pivots about a fulcrum to pivotally raise and lower the lid from the opening in the pipe. In either case, the displacement between open and closed positions is dependent on telemetry with sensors that measure fluid level, fluid flow, and environmental conditions at or near the field. In one embodiment, the valve actuation assembly further comprises a motor that actuates the lever to slide through the sleeve.

The alfalfa valve telemetry system further provides a mounting portion comprising a base platform and a plurality of legs, the legs helping to stabilize the lever sliding through the sleeve.

The alfalfa valve telemetry system further provides at least one environmental sensor that records at least one environmental condition on and near the field. The environmental sensor comprises an environmental transmitter that relays at least one environmental data to the assembly receiver. In this manner, the environmental data is based on the environmental condition.

The alfalfa valve telemetry system further provides at least one fluid sensor that detects a fluid level and a fluid flow rate in the field and in the fluid supply pipe. The fluid sensor comprises a fluid transmitter that relays at least one fluid data to the assembly receiver. In this manner, the fluid data is based on the fluid level and the fluid flow rate.

The alfalfa valve telemetry system further provides a primary controller that is in communication with the fluid transmitter and the environmental transmitter. The primary controller receives the fluid data and the environmental data from the fluid sensor and environmental sensor, respectively. The primary controller comprises a processor that processes the fluid data and the environmental data. At least one data signal is derived when a predetermined threshold has been exceeded.

The alfalfa valve telemetry system further provides an assembly receiver that is in communication with the primary controller and the motor. The assembly receiver receives the at least one data signal from the primary controller. Further, the assembly receiver regulates power to the motor in response to the data signal. In this manner, the environmental condition, the fluid level, and the fluid flow rate are determinative for displacement of the lid between the open and closed positions.

In another aspect, the alfalfa valve is operational over an opening of a pipe defined by a perimeter forming a flange, the alfalfa valve in the open position enabling free flow of fluid through an opening in the pipe, the alfalfa valve in the closed position restricting free flow of fluid through the opening in the pipe.

In another aspect, the lid forms a seal with the flange at the perimeter of the pipe in the closed position.

In another aspect, the lid disengages from the flange in the open position.

In another aspect, the legs of the mounting portion attach to the perimeter of the pipe, whereby the mounting portion anchors the valve actuation assembly to the pipe.

In another aspect, the base platform of the mounting portion supports the primary controller.

In another aspect, the primary controller comprises a primary transmitter and a primary receiver.

In another aspect, the primary transmitter comprises a radio frequency transmitter in communication with a remote control unit.

In another aspect, the lid is disc-shaped.

In another aspect, the stem is threaded.

In another aspect, the at least one environmental data includes at least one of the following: temperature, humidity, moisture, wind speed, and wind direction.

In another aspect, the at least one fluid data includes at least one of the following: fluid height, milliliters per hour, cubic centimeters per second, and meters cubed per second.

One objective of the present invention is to automate control of irrigation fluid based upon fluid levels, fluid flow rate, and environmental conditions at or in the proximity of the field.

Another objective is to provide a fully automatic system that both monitors and controls fluid from a supply pipe running through an agricultural field to the extent that the need for employed labor is reduced.

Another objective is to automate flooding of an agricultural field.

Another objective is to minimize wastage of fluid during flood irrigation.

Yet another objective is to control the flow of fluid through a series of automated alfalfa valves in an agricultural field.

Yet another objective is to provide an automated valve actuation assembly that is relatively inexpensive and easily installed and which will control the level of fluid in a field.

Yet another objective is to enable both axial and pivotal articulation of the lid against the opening of the pipe.

Yet another objective is to provide a controllable irrigation system at minimum installation and operating costs.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIGS. 1A and 1B illustrate perspective views of exemplary alfalfa valve telemetry system that axially displaces a lid over a supply pipe opening in a vertical orientation, where FIG. 1A shows a closed position, and FIG. 1B shows an open position, in accordance with an embodiment of the present invention;

FIGS. 2A and 2B illustrate perspective views of exemplary alfalfa valve telemetry system axially displacing a disc-shaped lid over a supply pipe opening in an angled orientation, where FIG. 2A shows a closed position, and FIG. 2B shows an open position, in accordance with an embodiment of the present invention;

FIGS. 3A and 3B illustrate perspective views of exemplary alfalfa valve telemetry system pivotally displacing a disc-shaped lid over a supply pipe opening, where FIG. 3A shows a closed position, and FIG. 3B shows an open position, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An alfalfa valve telemetry system 100 is referenced in FIGS. 1A-7B. The alfalfa valve telemetry system, hereafter "system 100" provides an alfalfa valve that operates over a fluid supply pipe to regulate the discharge of fluid onto an irrigation-dependent field. The system utilizes telemetry means to regulate the alfalfa valve between an open position that enables free flow of the fluid, and a closed position that restricts discharge of the fluid onto the irrigation field. The present invention automates the regulation of the fluid based on the level of fluid in the field, the flow rate of the fluid through the pipe and the field, and the environmental data, so as to conserve fluid and more efficiently irrigate the field.

Figure 5:
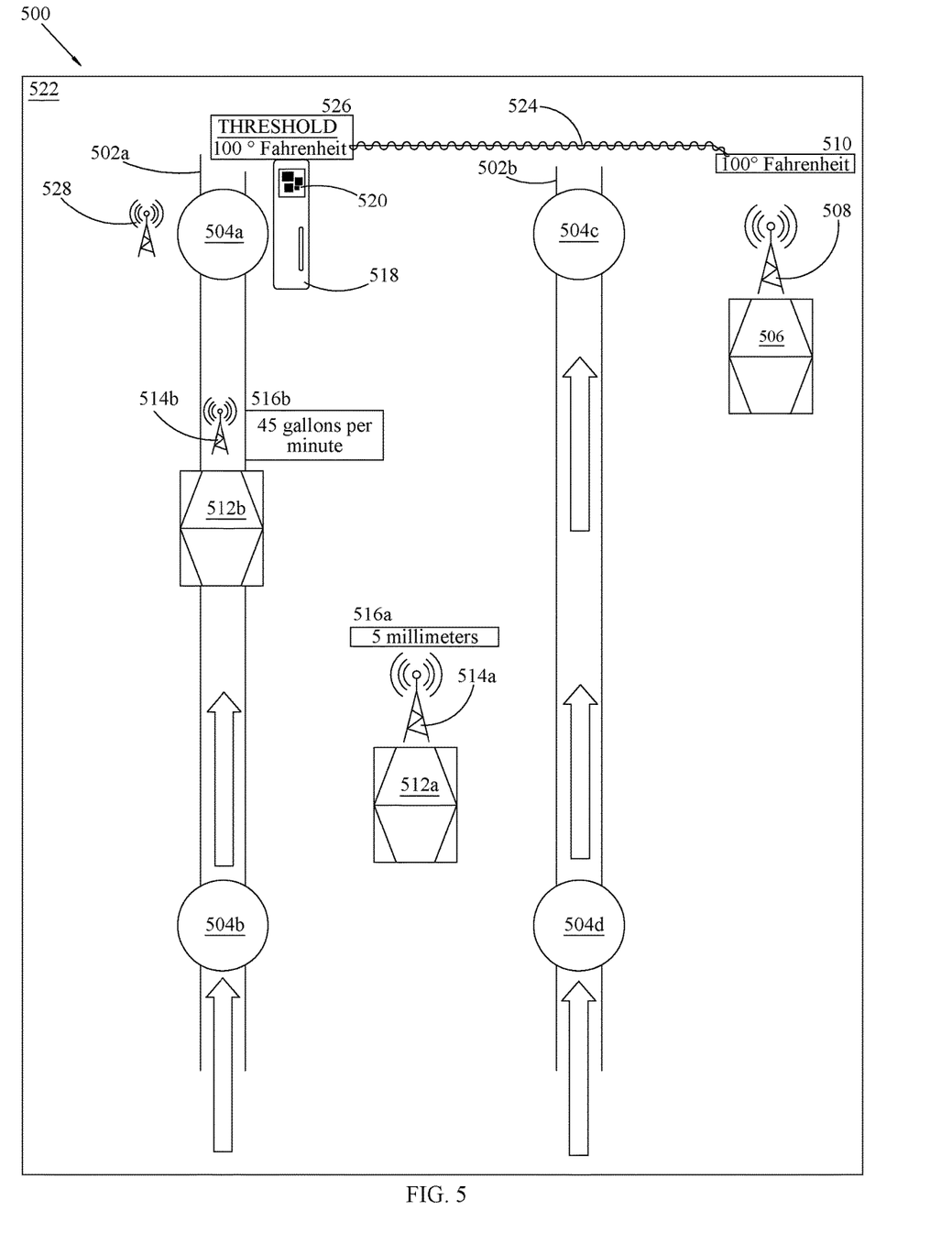
FIG. 5 illustrates a block diagram of an exemplary alfalfa valve telemetry system, in accordance with an embodiment of the present invention.

The fluid supply pipe, or a plurality of supply pipes, are disposed through an agricultural field to discharge fluid to the crops therein (See FIG. 5). In one embodiment, the supply pipe has a flanged opening that forms a flat flange at the perimeter. The fluid supply pipe carries the fluid from a distally located fluid source. The fluid supply pipe may be in fluid communication with a series of subterranean pipes to supply irrigation fluid at low pressures. The fluid discharges through the opening in the pipe. The fluid may include irrigation water used to water an agricultural field.

Figure 1A:
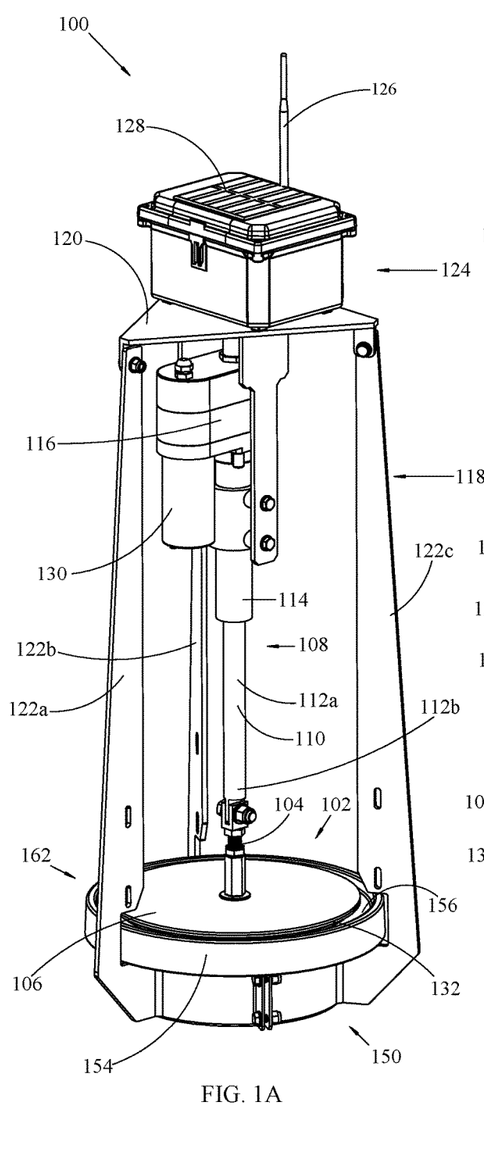

As referenced in FIG. 1A, the alfalfa valve comprises a stem that carries a lid from one end. The stem may be threaded to enable adjustable height positioning of the lid relative to the fluid supply pipe. This can be useful for accommodating the system to variously sized and dimensioned fluid supply pipes. The lid may be disc-shaped to fit to the perimeter of the fluid supply pipe. Though the shape of the lid can be changed to accommodate variously shaped pipe perimeters. The lid forms a seal with the flange at the perimeter of the pipe in the closed position (See FIG. 1A). The lid disengages from the flange to enable free flow of the fluid from the open position (See FIG. 1B).

In some embodiments, the internal side of the lid that engages the flange at the perimeter of the pipe opening may include a seal that creates a fluid tight seal around the perimeter of the pipe opening. The seal may include an annular rubber member that matches the perimeter of the pipe opening. The seal may also include an expansion joint to expand and retract the diameter of the seal. In one alternative embodiment, a P-seal forms around the perimeter of the lid to enhance the engagement with the pipe opening.

The stem concentrically positions the lid over the pipe opening. In one embodiment, the lid is axially disposed over the opening. In other embodiments however, the lid is pivotally disposed over the opening of the pipe. In any case, the alfalfa valve is configured to operate directly over the opening of the fluid supply pipe. In an open position, the alfalfa valve enables the free flow of fluid through the opening in the pipe. In the closed position, the alfalfa valve restricts the free flow of fluid through the opening in the pipe. By regulating the open and closed positions of the alfalfa valve, the appropriate water can reach the field.

The system also provides a telemetry-controlled, valve actuation assembly. The valve actuation assembly is configured to axially or pivotally displace the alfalfa valve between the open and closed positions over the opening in the supply pipe. This allows the alfalfa valve to regulate the flow of fluid to the field. As discussed above, the positioning of the alfalfa valve is based on telemetry, or data signals received from sensors, and which include fluid levels, fluid flow rate, and environmental conditions on and proximal to the field. The valve actuation assembly displaces the alfalfa valve according to these parameters.

The valve actuation assembly comprises a lever that is defined by a first end and a second end. The valve actuation assembly further comprises a sleeve that slidably receives the first end of the lever. In one embodiment, the lever slidably passes through the sleeve, reciprocating axially there through to displace the lid between the open and closed positions. The sleeve receives the lever in this manner to enable smooth slidable articulation of the lever while displacing the lid between the open and closed positions. In one embodiment, the second end of the lever is attached to the lid of the alfalfa valve to raise and lower the lid from the opening in the pipe in an axial, up and-down arrangement.

In one embodiment, the valve actuation assembly further comprises a motor that actuates the lever to slide through the sleeve. The motor may include a small electrical motor that is under command of an assembly receiver. The motor regulates power to the lever. This regulation of power may include: powering on, powering off, increasing speed, decreasing speed, and reversing. In some embodiments, an internal power source, i.e., battery, or a solar panel may provide power to the motor.

Figures 2A, 2B:
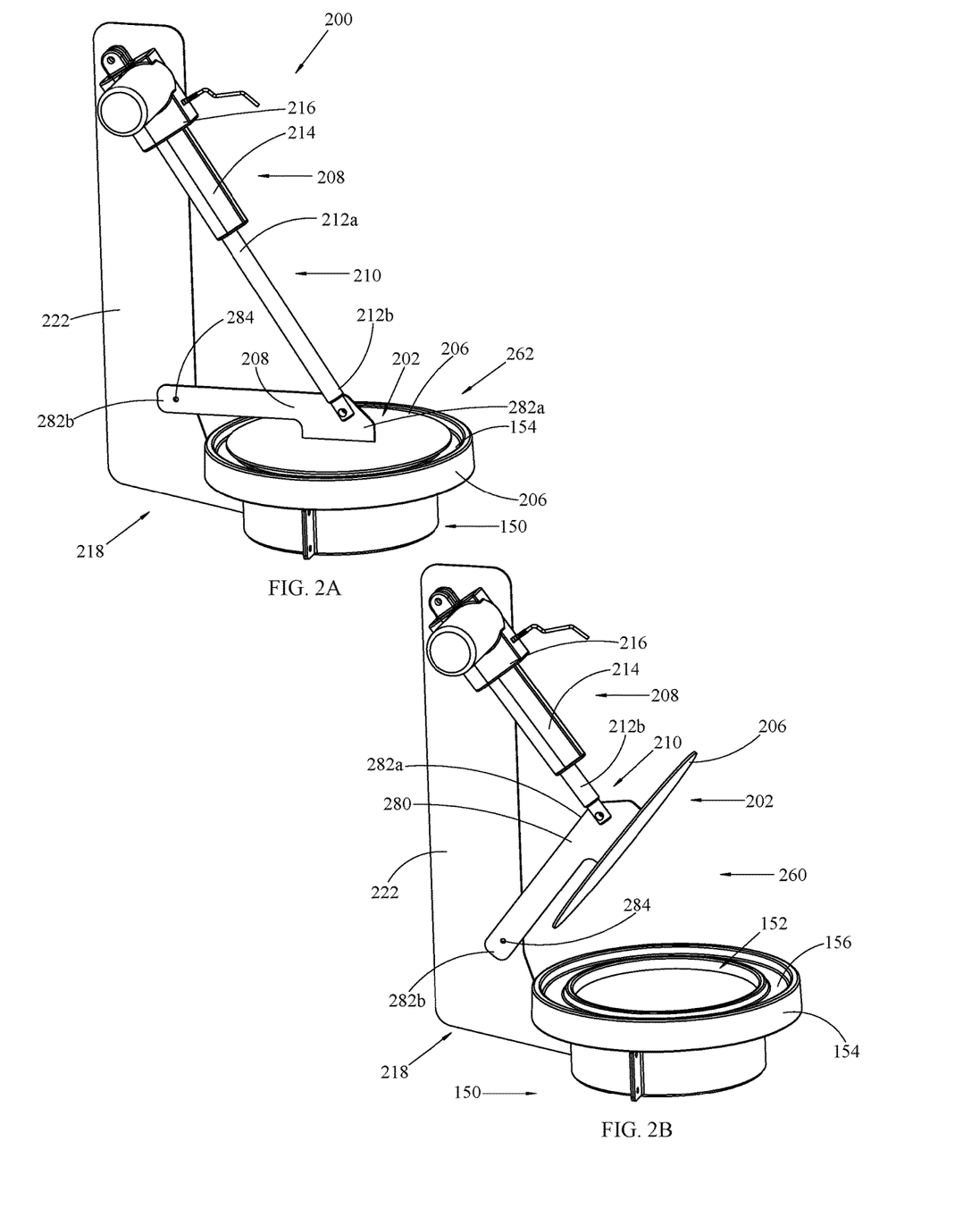

In a second embodiment of an alfalfa valve telemetry system 200, shown in FIGS. 2A and 2B, articulation of the lid from the alfalfa valve is not the axial, up-and-down displacement; but rather, a lid 206 of an alfalfa valve 202 pivotally raises and lowers between the open position 260 and closed position 262 over the pipe opening 152. In this configuration, a pivotable arm 280 is used to pivotally displace the lid 206, rather than the lever 210. The pivotable arm 280 is pivotally attached to a leg 222 that extends from a mounting portion 218 (discussed below) through a fulcrum 284. The pivotable arm is defined by a lid end 282*a* that attaches to the lid 206 of the alfalfa valve 202, and a leg end 282*b* that attaches to the leg 222 of the mounting portion 218. The pivotable arm 280 pivots about the fulcrum 284 on the leg 222 of the mounting portion 218 to pivotally raise and lower the lid 206 over the opening of the pipe 150.

Similar to the first embodiment, the valve actuation assembly 208 comprises a lever 210 that is defined by a first end 212*a* and a second end 212*b*. The valve actuation assembly 208 further comprises a sleeve 214 that slidably receives the first end 212*a* of the lever 210. The second end 212*b* of the lever 210 is attached to the lid end 282*a* of the pivotable arm 280. The motor 216 regulates power to axially displace the lever 210 through the sleeve, causing pivotal displacement of the pivotable arm 280 between the open and closed positions 260, 262.

Figure 3A:
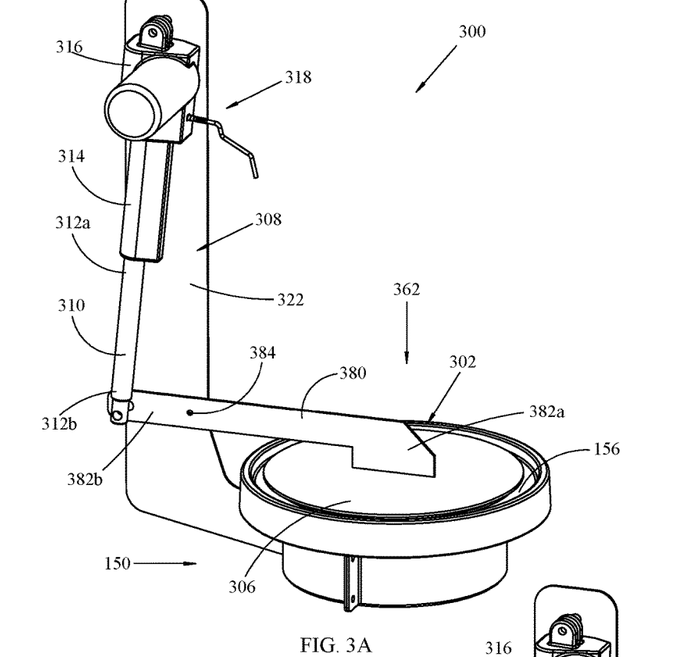
Figure 3B:
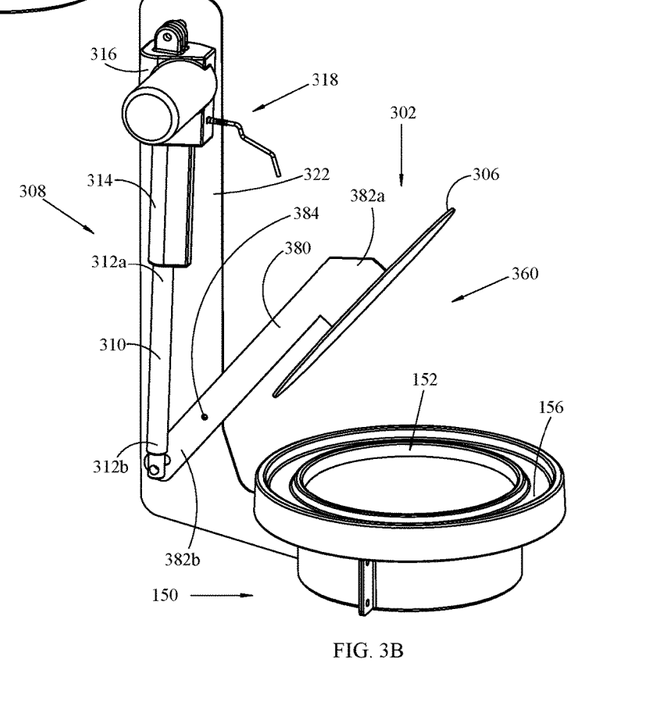
Figure 4:
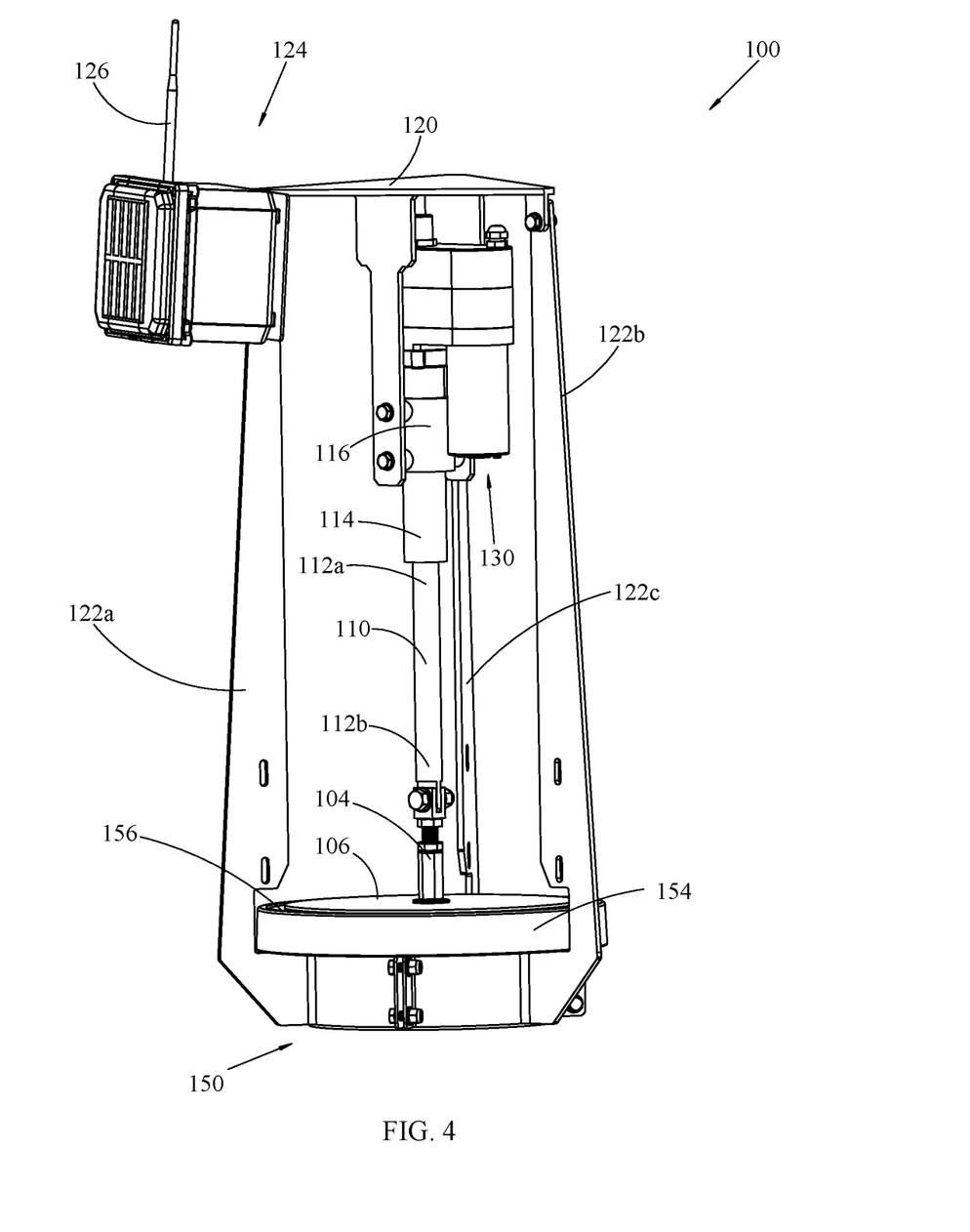
FIG. 4 illustrates a perspective view of the alfalfa valve shown in FIG. 1A, with a side mounted primary controller, in accordance with an embodiment of the present invention.

Turning now to FIGS. 3A and 3B, another embodiment of an alfalfa valve telemetry system 300 does not utilize the axial, up-and-down displacement to displace the lid of the alfalfa valve; but rather pivotally raises and lowers a lid 306 of an alfalfa valve 302 between the open and closed positions 360, 362. In this configuration, a pivotable arm 380 is used to pivotally displace the lid 306, rather than the lever 310. The pivotable arm 380 is pivotally attached to a leg 322 that extends from a mounting portion 318 through a fulcrum 384. The pivotable arm 380 has a lid end 382a that attaches to the lid 306 of the alfalfa valve 302, and a leg end 382b that attaches to the leg 322 of the mounting portion 318. The pivotable arm 380 pivots about a fulcrum 384 on the leg 322 of the mounting portion 318 to pivotally raise and lower the lid 306 over the pipe opening 152.

Continuing, the valve actuation assembly comprises a lever 310 that is defined by a first end 312a and a second end 312b. The valve actuation assembly 308 further comprises a sleeve 314 that slidably receives the first end 312a of the lever 310. The second end 312b of the lever 310 is attached to the leg end 382b of the pivotable arm 380. This attachment to the leg end 382b is different than the attachment to the lid end 282a attachment to the lever 210 described for the second embodiment system 200. Though, both embodiments 200, 300 operate substantially the same for purposes of regulating discharge of fluid through the pipe opening 152.

A motor 316 regulates power to axially displace the lever 310 through the sleeve 314, causing pivotal displacement of the pivotable arm 380 between the open and closed positions 360, 362. In this manner, the lever 310 axially slides through the sleeve 314, causing the pivotable arm 380 to pivotally displace the lid 306 between the open and closed positions 360, 362. However, for any of the above mentioned systems 100, 200, 300 for lid displacement, the axial or pivotal displacement between open and closed positions is dependent on telemetry with sensors that measure fluid level, fluid flow, and environmental conditions at or near the field, as described below.

Figure 1B:
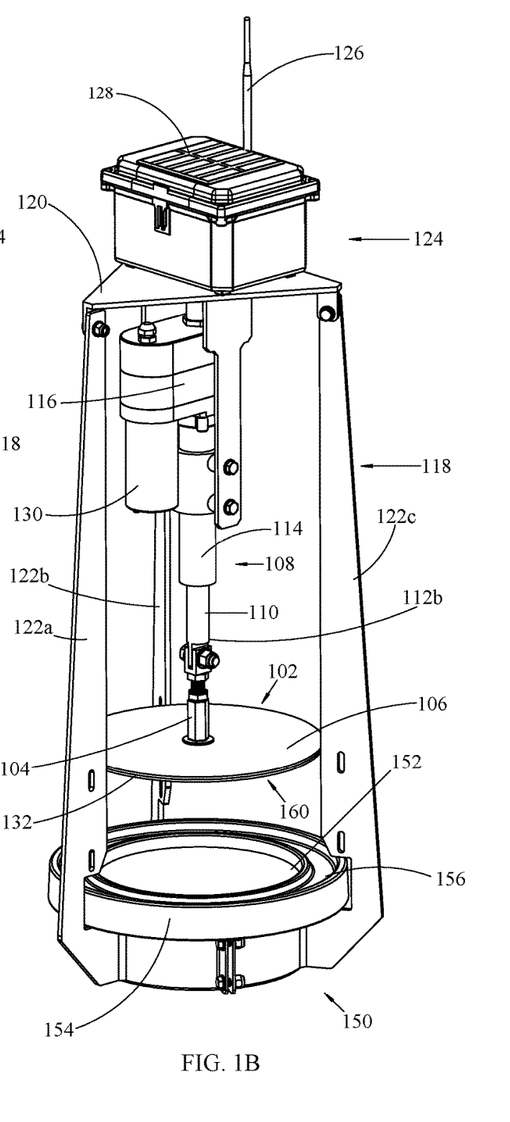

In operation of the valve actuation assembly 108, the sleeve 114 and the lever 110 (and optionally, the pivotable arm 280 and fulcrum 284) serve to displace the lid 106 towards the pipe opening 152, so that the perimeter 132 of the lid 106 presses against the flange 156 that forms at the perimeter 154 of the pipe 150. This creates a sealed engagement there between that works to restrict the flow of fluid through the opening 152 in the pipe 150. To enable free flow of fluid through the pipe opening 152. The sleeve 114, lever 110, pivotable arm 280, and fulcrum 284 work together to displace the lid 106 distally, away from the pipe 150, so that the opening 152 is unobstructed, and fluid discharges on the field.

The system 100 further provides a mounting portion 118 that anchors the valve actuation assembly 108 and the alfalfa valve 102 to the fluid supply pipe 150. The mounting portion 118 comprises a base platform 120 and a plurality of legs 122a-c. The base platform 120 of the mounting portion 118 supports a primary controller 124, as described below. In other embodiments shown in FIG. 4, one of the legs 122a from the mounting portion 118 may be used to mount the primary controller 124.

The legs 122a-c run parallel to the fluid supply pipe 150, holding the valve actuation assembly in an upright position. In one non-limiting embodiment, three equidistant legs 122a, 122b, 122c having an elongated, flat shape extend along the length of the valve actuation assembly 108. Further, the legs 122a-c of the mounting portion 118 attach to the perimeter 154 of the pipe 150, anchoring the valve actuation assembly 108 to the fluid supply pipe 150. In this manner, the legs 122a-c help to stabilize the lever 110 while sliding through the sleeve 114. In systems 200, 300 however, the mounting portion 218, 318 comprises only one leg 222, 322 that serves to anchor the valve actuation assembly 208, 308 to the fluid supply pipe 150.

As discussed above, the system is configured to regulate the positon of the alfalfa valve through telemetry means. Those skilled in the art will recognize that telemetry is an automated communications process by which measurements and other data are collected at remote or inaccessible points (the field) and transmitted to receiving equipment for monitoring.

FIG. 5 references an exemplary alfalfa valve telemetry system 500 containing a pair of fluid discharge pipes 502a, 502b for discharging water on a field 522. Multiple alfalfa valves 504a, 504b, 504c, 504d provide regulated outlets for the fluid in the pipes 502a-b. The system 500 provides at least one environmental sensor 506 that is operational at or near the agricultural field 500, so as to record at least one environmental condition, including such parameters that are important for agricultural purposes, such as temperature, rain, humidity, and the like.

The environmental sensor 506 comprises at least one environmental transmitter 508 that relays at least one environmental data 510 to a primary controller 518 for actuation of the motor, as discussed below. A processor 520 in the primary controller 518 calculates the environmental data 510 from the at least one detected environmental condition. The environmental data 510 may include, without limitation, temperature, humidity, moisture, wind speed, and wind direction. For example: a thermostat records the temperature, and a psychrometer measures humidity. The environmental data 510 may be relayed in many signal forms, including: data signals, radio waves, code, and alphanumeric digits.

Those skilled in the art will recognize that the environmental conditions are determinative for the amount of fluid that should be supplied to the field. For example, drought conditions with little moisture in the air dictate that additional fluid should be allowed to discharge through the pipe and onto the field; and thereby the alfalfa valve is displaced to the open position more regularly.

The system 500 further provides at least one fluid sensor 512a, 512b that is operational in both the field 522, and in the fluid supply pipes 502a-b. The fluid sensor 512a-b may include, without limitation, an ultrasonic sensor, a pressure transducer, a bubbler, and a float sensor. In one embodiment, the fluid sensor 512a detects a fluid level on the field 522. The fluid level indicates the amount of moisture, or standing water in the field 522. In other embodiments, the fluid sensor 512b also detects a fluid flow rate inside, or proximal to the fluid supply pipe. This indicates the amount of fluid, and flow rate of the fluid in the pipe.

The fluid sensor 512a-b comprises at least one fluid transmitter 514a, 514b that relays at least one fluid data 510 to the primary controller 518 for actuation of the motor. Both the fluid level and fluid flow rate are instructive in determining how much fluid should be released to the field through the alfalfa valve 504a-d. In some embodiments, the fluid data 516a-b may include, without limitation: fluid height in centimeter or millimeters, gallons per minute flow rate, milliliters per hour flow rate, and cubic centimeters per second flow rate.

Figures 6A, 6B:
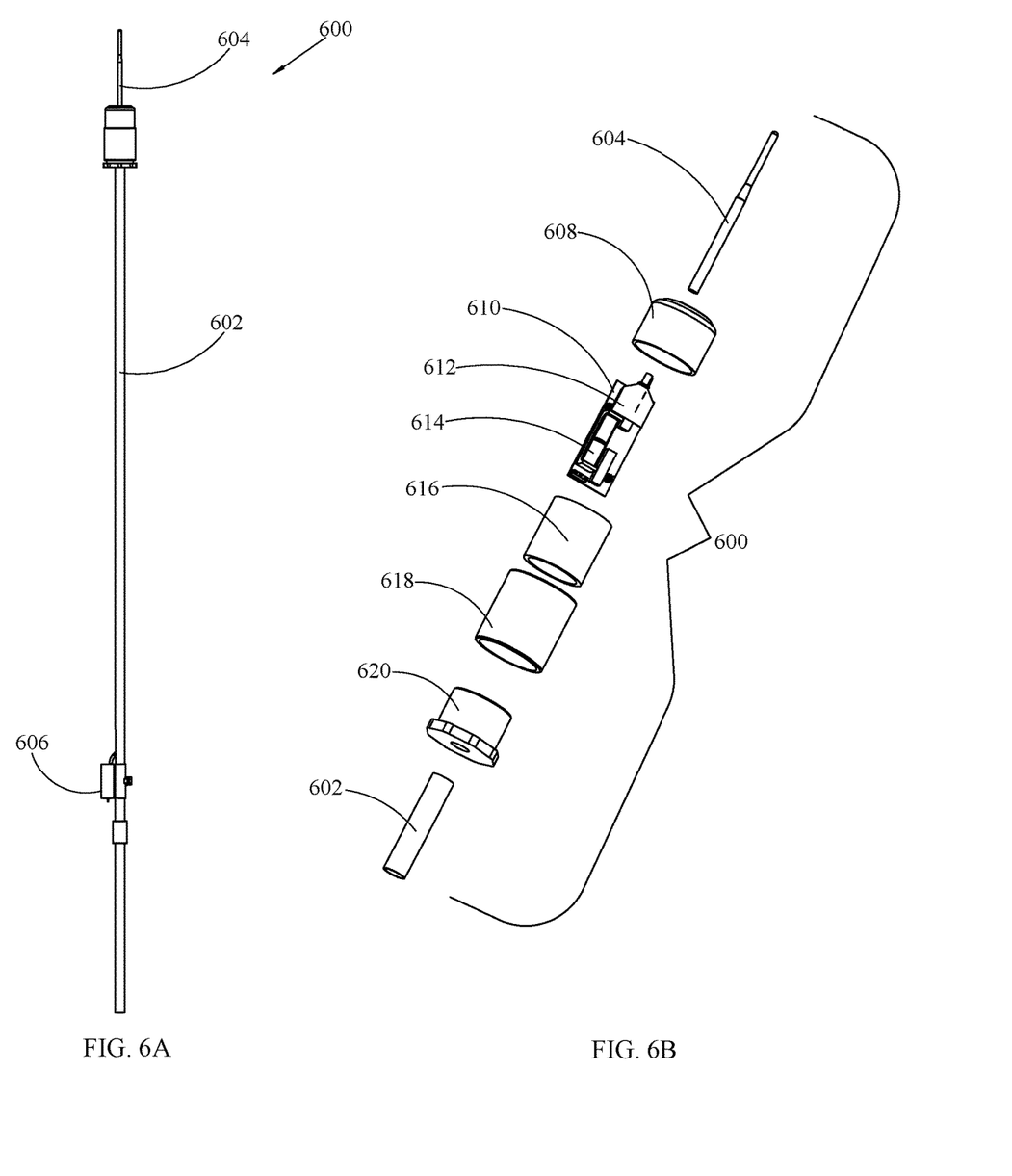
FIGS. 6A and 6B illustrates an exploded view of a fluid sensor, in accordance with an embodiment of the present invention.

FIG. 6A illustrates an exemplary fluid sensor 600. The fluid sensor 600 may include a radio-equipped smart assembly mounted to a mast 602 located at a convenient location down-field of a set of gates. The fluid sensor 600 has the capacity to manage gate assignment, incoming data, and radio frequency transmissions through a control panel 606. A sensor transmitter 604 enables radio frequency transmissions between the fluid sensor and the valve actuation assembly platform. In one embodiment, the fluid sensor 600 detects surface fluid level and transmits that data to a primary controller located in the field.

FIG. 6B illustrates a blowup view of the fluid sensor 600 referenced in FIG. 6A. The components of fluid sensor 600 include: a mast 602, a sensor transmitter 604 (antenna), a control panel 606, a lid 608, a microprocessor 610, a radio 612, a battery 614, a radio housing body 616, a radio coupling housing 618, and a radio body base 620. These components work together to detect moisture and communicate the findings. The level and flow rate of fluid in the pipe and field may be determined through floats, hydrostatic devices, gravimetric devices, load cells, magnetic level gauges, and other fluid detecting means known in the art.

Continuing with FIG. 5, the system 504a provides a primary controller 518 that is in communication with the fluid sensor 512a-b and environmental sensor 506. The primary controller 518 receives the fluid data 516a-b and the environmental data 510 from the fluid transmitter 514a-b and the environmental transmitter 508, respectively. This communication may include wireless data transfer through radio waves, satellite, or Internet. Though in other embodiments, wired communications, including fiber optic cables, may also be used for data transfer to the primary controller 518.

The primary controller 518 comprises a processor 520 that processes the fluid data 516a-b and the environmental data 510. The processor 520 may include a PLC module that is configured to calculate the environmental data and fluid data through use of an algorithm. One example of processing the data 510, 516a-b includes summing, averaging, and dividing the data. The data 510, 516a-b can also be timed, processed against a calendar, and altered.

As a result of the processor 520, the processed fluid data 516a-b and environmental data 510 derives at least one data signal 524 when a predetermined threshold 526 is exceeded. The threshold 526 may include a quantitative environmental data or fluid data that, when achieved, triggers one or more of the alfalfa valves 504a-d to the open or closed positions.

For example, if the temperature exceeds 100° Fahrenheit for an excess of six hour threshold, the alfalfa valve 504a is triggered to the open position. Or if the fluid level of water in the field is above 5 centimeters threshold, the alfalfa valve 504b is locked into the closed position until the water recedes. In other embodiments however, myriad combinations of environmental conditions, fluid levels, and fluid flow rates can be preset as a threshold. Those skilled in the art will recognize that the type of crop being grown, and the environment of the field are determinative of the appropriate threshold.

Those skilled in the art will recognize that the fluid conditions in the field 500 and in the fluid supply pipe 502a-b are determinative for the amount of fluid that should be supplied to the field by the fluid supply pipe 502a-b. For example, if the field is flooded, or if the fluid supply pipe contains excessively high pressure, the alfalfa valve should be moved to the closed position more regularly, so as to restrict flowage through the pipe opening. Thus, setting a threshold 526 allows for customizing the irrigation based on crop types and the environment of the field 522.

Thus, the primary transmitter 518 transmits the data signal 524 (if threshold is achieved) to the assembly receiver. The assembly receiver may then utilize the data signal to actuate the motor. In one non-limiting embodiment, the primary transmitter comprises a radio frequency transmitter in communication with a remote control unit. This automated, remote control allows for irrigating large agricultural fields from remote points. The primary controller 518 may also have an independent power source 128, such as a solar panel, for independent power.

Figure 7A:
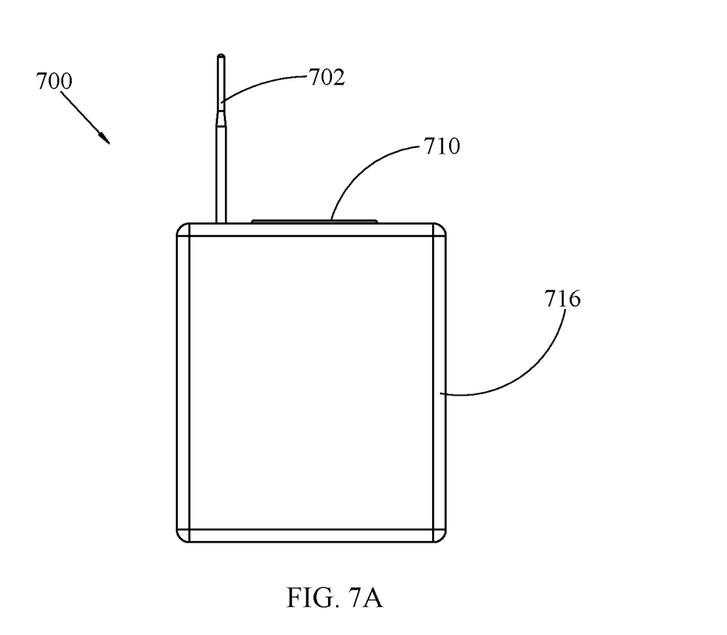
FIGS. 7A and 7B illustrates a blow up view of a primary controller, in accordance with an embodiment of the present invention.
Figure 7B:
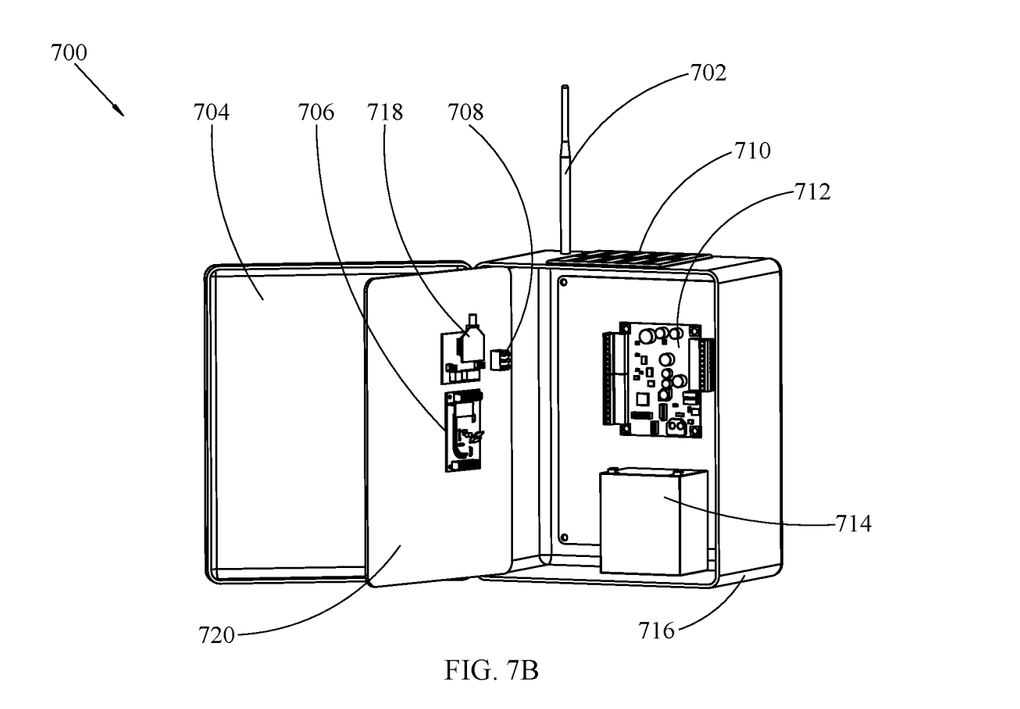

FIG. 7A illustrates a perspective view of an exemplary primary controller 700, with the gate/door open; while FIG. 7B shows the primary controller 700 with the door open. In this configuration, the primary controller 700 comprises: a transmitter 702, a receiver 718, a master control cover 704, a processor 712 (PLC module), a radio frequency module 706, a control solar panel 710, a switch module 708, a control battery 714, and a control housing 716. A swing panel 720 carries the radio frequency module 706, receiver 718, and switch module 706. These components of the primary controller 700 enable communication with the fluid sensor, environmental sensor, and valve actuation assembly.

In another embodiment, the primary controller is a radio-based device, like a remote terminal unit (RTU). Such a primary controller may include a PLC-type controller that controls delivery gates based on data from the fluid sensor, a smart switch PCB board that when combined with fluid sensor in the field to activate the primary controller when the fluid is delivered to the field. The primary controller 700 may be dormant until fluid is present for flood irrigation.

In another embodiment of the primary controller, a first radio frequency module is in communication with a base station. A second radio frequency module is in communication with a controller. A third radio frequency module is in communication with another controller. A fourth radio frequency module is in communication with another controller. A fifth radio frequency module is in communication with another controller. A sixth radio frequency module is in communication with yet another controller. The radio frequency modules may be operational throughout different areas of the field.

As discussed in FIG. 5, the system 500 also provides an assembly receiver 528 that is in communication with both, the primary controller 518 and the motor 116. The communications by the assembly receiver 528 include environmental and fluid data that are pertinent to an agricultural field and environmental conditions at or near the field. This data is determinative for triggering the motor, and consequently moving the lid of the alfalfa valve between the open and closed positions. The assembly receiver 528 is configured to receive the data signal from the primary controller 518. Further, the assembly receiver 528 regulates power to the motor in response to the data signal 524. In this manner, the environmental condition, the fluid level, and the fluid flow rate are determinative for displacement of the lid between the open and closed positions.

In operation of the system 100, the alfalfa valve 102 is mounted over an opening 152 of a fluid supply pipe 150. The mounting portion 118 anchors the valve actuation assembly 108 to the pipe 150 with bolts, welding, or other fastening means known in the art of irrigation. In this manner, the lever 110 and/or pivotable arm 280 are stabilized while articulating to displace the lid 106 between the open and closed positions 160, 162. The environmental sensor in the field is monitored to determine an environmental data. The fluid sensors in the field and in the pipe are monitored to determine a fluid level data and fluid flow data.

The fluid level, the flow rate, and the environmental condition are communicated from the sensors to a primary controller. The processor in the primary controller processes the environmental data and the fluid data. If the processed environmental data and fluid data achieves a predetermined threshold, at least one data signal is relayed to the assembly receiver. In response, the motor of the valve actuation assembly is triggered to displace (axially or pivotally) the lever of the alfalfa valve. This causes the lid to move between the open and closed positions, based at least partially on the calculations performed by the processor for the environmental conditions, fluid level, and fluid flow.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An alfalfa valve telemetry system, the system comprising:
   an alfalfa valve comprising a stem carrying a lid, the alfalfa valve operational over an opening of a fluid supply pipe defined by a perimeter forming a flange, the alfalfa valve in the open position enabling free flow of fluid through an opening in the pipe, the alfalfa valve in the closed position restricting free flow of fluid through the opening in the pipe;
   a valve actuation assembly displacing the lid between an open position and a closed position, the valve actuation assembly comprising a lever defined by a first end and a second end, the valve actuation assembly further comprising a sleeve that slidably receives the first end of the lever, the second end of the lever being attached to the lid of the alfalfa valve,
   whereby the lever axially slides through the sleeve to displace the lid between the open and closed positions,
   the valve actuation assembly further comprising a motor, the motor actuating the lever to slide through the sleeve;
   a mounting portion comprising a base platform and a plurality of legs, the legs helping to stabilize the lever sliding through the sleeve, the plurality of legs running parallel to the pipe and holding the valve actuation assembly in an upright position;
   the motor of the valve actuating assembly carried by the base platform between the plurality of legs in substantially direct overhead relationship to the lever;
   at least one environmental sensor recording at least one environmental condition, the environmental sensor comprising an environmental transmitter relaying at least one environmental data to an assembly receiver, whereby the environmental data is based on the environmental condition;
   at least one fluid sensor detecting a fluid level and a fluid flow rate, the fluid sensor comprising a fluid transmitter relaying at least one fluid data to the assembly receiver, whereby the fluid data is based on the fluid level or the fluid flow rate;
   a primary controller being in communication with the fluid transmitter and the environmental transmitter, the primary controller receiving the fluid data and the environmental data, the primary controller comprising a processor, the processor processing the fluid data and the environmental data, the processed fluid data and the processed environmental data deriving at least one data signal when exceeding a predetermined threshold; and
   the assembly receiver in communication with the primary controller and the motor, the assembly receiver receiving the at least one data signal, the assembly receiver regulating power to the motor in response to the data signal,
   whereby the environmental condition, the fluid level, and the fluid flow rate are determinative for displacement of the lid between the open and closed positions; and
   wherein the motor axially displaces the lid over the opening of the pipe with the lever and the valve actuating assembly deployed in a vertical orientation.

2. The system of claim 1, wherein the lid forms a seal with the flange at the perimeter of the pipe in the closed position.

3. The system of claim 2, wherein the lid disengages from the flange in the open position.

4. The system of claim 3, wherein the legs of the mounting portion attach to the perimeter of the pipe, whereby the mounting portion anchors the valve actuation assembly to the pipe.

5. The system of claim 1, wherein the base platform of the mounting portion supports the primary controller.

6. The system of claim 1, wherein the primary controller comprises a primary transmitter and a primary receiver.

7. The system of claim 1, wherein the primary transmitter comprises a radio frequency transmitter in communication with a remote control unit.

8. The system of claim 1, wherein the lid is disc-shaped, and the stem is threaded.

9. The system of claim 1, wherein the primary controller comprises a power source.

10. The system of claim 1, wherein the at least one environmental data includes at least one of the following: temperature, humidity, moisture, wind speed, and wind direction.

11. The system of claim 1, wherein the at least one fluid data includes at least one of the following: fluid height, milliliters per hour, cubic centimeters per second, and meters cubed per second.

12. An alfalfa valve telemetry system, the system comprising:
   an alfalfa valve comprising a stem carrying a lid;
   a mounting portion comprising at least one leg;
   a pivotable arm defined by a leg end and a lid end, the leg end pivotally attached to the leg at a fulcrum, the lid end attached to the lid;
   a valve actuation assembly attached to the leg and displacing the lid between an open position and a closed position, the valve actuation assembly comprising a lever defined by a first end and a second end, the valve actuation assembly further comprising a sleeve that slidably receives the first end of the lever, the second end of the lever being attached to the lid end of the pivotable arm,
   whereby the lever axially slides through the sleeve to pivotally displace the lid between the open and closed positions,
   whereby the leg helps stabilize the lever sliding through the sleeve,
   the valve actuation assembly further comprising a motor supported by the leg in spaced-apart relationship to the fulcrum, the motor actuating the lever to slide through the sleeve;
   at least one environmental sensor recording at least one environmental condition, the environmental sensor comprising an environmental transmitter relaying at least one environmental data to an assembly receiver, whereby the environmental data is based on the environmental condition;
   at least one fluid sensor detecting a fluid level and a fluid flow rate, the fluid sensor comprising a fluid transmitter relaying at least one fluid data to the assembly receiver, whereby the fluid data is based on the fluid level and the fluid flow rate;

a primary controller being in communication with the fluid transmitter and the environmental transmitter, the primary controller receiving the fluid data and the environmental data, the primary controller comprising a processor, the processor processing the fluid data and the environmental data, the processed fluid data and the processed environmental data deriving at least one data signal when exceeding a predetermined threshold; and the assembly receiver in communication with the primary controller and the motor, the assembly receiver receiving the at least one data signal, the assembly receiver regulating power to the motor in response to the data signal, whereby the environmental condition, the fluid level, and the fluid flow rate are determinative for displacement of the lid between the open and closed positions, wherein the alfalfa valve is operational over an opening of a fluid supply pipe defined by a perimeter forming a flat flange, the alfalfa valve in the open position enabling free flow of fluid through an opening in the pipe, the alfalfa valve in the closed position restricting free flow of fluid through the opening in the pipe, and wherein the motor axially displaces the lid over the opening of the pipe with the lever and the valve actuating assembly deployed in an angled orientation with respect to the lid.

13. The system of claim 12, wherein the lid forms a seal with the flange at the perimeter of the pipe in the closed position.

14. The system of claim 13, wherein the lid disengages from the flange in the open position.

15. The system of claim 14, wherein the leg of the mounting portion attaches to the pipe, whereby the mounting portion anchors the valve actuation assembly to the pipe.

16. An alfalfa valve telemetry system, the system comprising:

an alfalfa valve comprising a stem carrying a lid;

a mounting portion comprising at least one leg;

a pivotable arm defined by a leg end and a lid end, the leg end pivotally attached to the leg at a fulcrum, the lid end attached to the lid;

a valve actuation assembly displacing the lid between an open position and a closed position, the valve actuation assembly comprising a lever defined by a first end and a second end, the valve actuation assembly further comprising a sleeve that slidably receives the first end of the lever, the second end of the lever being attached to the leg end of the pivotable arm, whereby the lever axially slides through the sleeve to pivotally displace the lid between the open and closed positions, whereby the leg helps stabilize the lever sliding through the sleeve, the valve actuation assembly further comprising a motor supported by the leg in spaced-apart relationship to the fulcrum, the motor actuating the lever to slide through the sleeve;

at least one environmental sensor recording at least one environmental condition, the environmental sensor comprising an environmental transmitter relaying at least one environmental data to an assembly receiver, whereby the environmental data is based on the environmental condition;

at least one fluid sensor detecting a fluid level and a fluid flow rate, the fluid sensor comprising a fluid transmitter relaying at least one fluid data to the assembly receiver, whereby the fluid data is based on the fluid level and the fluid flow rate;

a primary controller being in communication with the fluid transmitter and the environmental transmitter, the primary controller receiving the fluid data and the environmental data, the primary controller comprising a processor, the processor processing the fluid data and the environmental data, the processed fluid data and the processed environmental data deriving at least one data signal when exceeding a predetermined threshold; and the assembly receiver in communication with the primary controller and the motor, the assembly receiver receiving the at least one data signal, the assembly receiver regulating power to the motor in response to the data signal, whereby the environmental condition, the fluid level, and the fluid flow rate are determinative for displacement of the lid between the open and closed positions;

wherein the alfalfa valve is operational over an opening of a fluid supply pipe defined by a perimeter forming a flange, the alfalfa valve in the open position enabling free flow of fluid through an opening in the pipe, the alfalfa valve in the closed position restricting free flow of fluid through the opening in the pipe; and wherein the sleeve, the lever, the pivotable arm and the fulcrum work together to displace the lid distally, away from the pipe so that the opening of the pipe is unobstructed as fluid discharges from the opening.

17. The system of claim 16, wherein the leg of the mounting portion attaches to the pipe, whereby the mounting portion anchors the valve actuation assembly to the pipe.

* * * * *